US012689255B2

(12) United States Patent
Siepker

(10) Patent No.: US 12,689,255 B2
(45) Date of Patent: Jul. 21, 2026

(54) STATOR FOR AN ELECTRIC MACHINE, ELECTRIC MACHINE AND VEHICLE

(71) Applicant: VALEO EAUTOMOTIVE GERMANY GMBH, Erlangen (DE)

(72) Inventor: Carsten Siepker, Bad Neustadt a.d.Saale (DE)

(73) Assignee: VALEO EAUTOMOTIVE GERMANY GMBH, Erlangen (DE)

( * ) Notice: Subject to any disclaimer, the term of this patent is extended or adjusted under 35 U.S.C. 154(b) by 194 days.

(21) Appl. No.: 18/716,859

(22) PCT Filed: Dec. 19, 2022

(86) PCT No.: PCT/EP2022/086672
§ 371 (c)(1),
(2) Date: Jun. 5, 2024

(87) PCT Pub. No.: WO2023/117916
PCT Pub. Date: Jun. 29, 2023

(65) Prior Publication Data
US 2025/0047155 A1 Feb. 6, 2025

(30) Foreign Application Priority Data

Dec. 22, 2021 (EP) ...................................... 21217166

(51) Int. Cl.
*H02K 3/28* (2006.01)
(52) U.S. Cl.
CPC ...................................... *H02K 3/28* (2013.01)
(58) Field of Classification Search
CPC ........ F25B 31/008; H02K 5/16; H02K 5/203;

H02K 9/20; H02K 3/28; H02K 17/16;
H02K 2213/03; H02K 9/193; Y02B
30/70; F16C 33/6659
See application file for complete search history.

(56) References Cited

U.S. PATENT DOCUMENTS

| | | | | | |
|---|---|---|---|---|---|
| 2003/0214196 A1* | 11/2003 | Cai | ........................... | H02K 3/14 |
| | | | | 310/208 |
| 2018/0309337 A1* | 10/2018 | Lee | ........................... | H02K 3/12 |
| 2020/0067362 A1* | 2/2020 | Shiah | ....................... | H02K 3/28 |

FOREIGN PATENT DOCUMENTS

CN          109038878 A      12/2018

OTHER PUBLICATIONS

International Search Report Issued Apr. 17, 2023, in PCT/EP2022/086672, filed on Dec. 19, 2022, 2 pages.

* cited by examiner

*Primary Examiner* — Naishadh N Desai
(74) *Attorney, Agent, or Firm* — Oblon, McClelland, Maier & Neustadt, L.L.P.

(57) ABSTRACT

A stator includes a stator core with two opposing end sides and a plurality of grooves arranged in the peripheral direction, and a stator winding having number N≥3 of strands, wherein each strand is formed by a shaped conductor. Each groove is radially divided into first to L-th layers, which form first to L/2-th double layers. Within a number A of double layers of a respective winding zone, the receiving sites are nested with a neighbouring (in the peripheral direction) winding zone of another of the strands.

20 Claims, 9 Drawing Sheets

STATOR FOR AN ELECTRIC MACHINE, ELECTRIC MACHINE AND VEHICLE

The present invention relates to a stator for an electric machine, comprising a stator core which has a longitudinal axis, an end side, a further end side opposite the end side and a plurality of slots arranged in the circumferential direction and extending from the end side to the further end side, and a stator winding which has a number N of phases, wherein N≥3, wherein each phase is formed by shaped conductors which have leg portions arranged within the slots and connecting portions which electrically conductively connect two of the leg portions to each other at the end sides, wherein each slot is radially subdivided into first to L-th layers which are named according to their order in the radial direction, wherein the layers form first to (L/2)-th double layers, wherein the i-th double layer comprises the (2i−1)-th and the (2i)-th layer for all natural numbers $1 \leq i \leq (L/2)$, wherein L is ≥4 and even, wherein L and i are natural numbers, wherein each layer forms a receiving location in a respective slot in which one of the leg portions is arranged, wherein the receiving locations for a respective phase form a number of 2 P winding zones and in a respective winding zone the leg portions are traversed by the phase-forming shaped conductors in the same current direction when an N-phase alternating voltage is applied to the stator winding, wherein 2 P≥6, wherein P is a natural number, wherein each winding zone in each of the layers comprises a number q≥2 of receiving locations, wherein q is a natural number.

In addition, the invention relates to an electric machine and a vehicle.

From the article Lindner, Mathias; Moritz, Philipp; Jung, Jakob: "Hairpin-Wicklungen für elektrische Fahrantriebe" (Hairpin windings for electric traction drives): 2nd Freiberg Colloquium on Electric Drive Technology, Freiberg 2019, pages 140 to 154, stators with hairpin windings are known in which individual layers are chorded by displacement relative to each other, by block layering, symmetrical layering or alternating layering.

For stators with a stator winding of which the phases are formed by shaped conductors, the lowest possible torque ripple is desired, especially if they are intended for use in a traction drive. This requires a reduction in harmonic winding factors. In principle, the aim is to achieve an air gap field that is as sinusoidal as possible. To achieve this, the phases must be arranged in the slots for the shaped conductors in such a way that the winding factors for harmonic components are as low as possible and for the fundamental component are as high as possible.

The object of the invention is to describe a way of operating an electric machine having a stator winding formed from shaped conductors with a low torque ripple.

To achieve this object, it is provided in accordance with the invention in a stator of the type mentioned at the outset that, within a number A of double layers of a respective winding zone, the receiving locations are interlaced with a winding zone of another of the phases which is adjacent in the circumferential direction in such a way that the leg portions of the other phase are surrounded on both sides in the circumferential direction by two leg portions of the respective winding zone arranged in the double layer, wherein $1 \leq A \leq (L/2)-1$, wherein A is a natural number.

The stator according to the invention for an electric machine has a stator core. The stator core has a longitudinal axis. The stator core also has an end side. The stator core also has a further end side. The further end side is situated opposite the end side. The stator core further has a plurality of slots. The slots are disposed in the circumferential direction. The slots extend from the end side to the further end side. The stator furthermore has a stator winding. The stator winding has a number N of phases, wherein N≥3. Each phase is formed by shaped conductors. The shaped conductors have leg portions arranged within the slots. The shaped conductors also have connecting portions. The connecting portions each connect two of the leg portions to each other at the end sides in an electrically conductive manner. Each slot is subdivided radially into first to L-th layers. The layers are named according to their order in the radial direction. The layers form first to (L/2)-th double layers. The i-th double layer comprises the (2i−1)-th and the (2i)-th layer for all natural numbers $1 \leq i \leq (L/2)$, wherein L≥4 and is even. L and i are natural numbers. Each layer in a respective slot forms a receiving location. One of the leg portions is arranged in the receiving location. The receiving locations for a respective phase form a number 2 P of winding zones. In a respective winding zone, the leg portions of shaped conductors forming the phase are passed through in the same current direction when an N-phase alternating voltage is applied to the stator winding, wherein 2 P≥6. P is a natural number. Each winding zone comprises a number q≥2 of receiving locations in each of the layers. q is a natural number. Within a number A of double layers of a respective winding zone, the receiving locations are interlaced with a circumferentially adjacent winding zone of another of the phases. They are interlaced in such a way that the leg portions of the other phase are surrounded on both sides in the circumferential direction by two leg portions of the respective winding zone arranged in the double layer, wherein $1 \leq A \leq (L/2)-1$. A is a natural number.

The invention is based on the realization that an air gap field approximating a sinusoidal shape can be achieved by an interlaced arrangement of the winding zones in at least one of the double layers. In this double layer, the shape of the winding zone can therefore differ from the other [(L/2)−A] double layers. The interlaced design also makes it possible to minimize a winding overhang—in the sense of an axial extent of the connecting portions-on one of the end sides within the interlaced double layers.

The stator core is in particular formed from a multiplicity of axially layered individual laminations and/or individual laminations which are electrically insulated from one another. In this respect, the stator core can also be considered to be or referred to as a laminated stator core. The slots typically extend axially within the stator core. The number of phases is preferably exactly three or exactly six.

The shaped conductors preferably comprise a first type of shaped conductors, which have two leg portions and a connecting portion connecting the two leg portions at the end side. On the further end side, free ends can be connected to a respective leg portion of the first type of shaped conductor, each of which is electrically conductively connected to a free end of another shaped conductor, preferably in an integrally bonded manner, so that the connected free ends form a connecting portion on the further end side. The free ends of the first type of shaped conductor can point away from each other in the circumferential direction. The shaped conductors can also comprise a second type of shaped conductors, which correspond to the first type of shaped conductor, but in which the free ends point in the same circumferential direction. The shaped conductors may further comprise a third type of shaped conductors, which have a leg portion, a free end on the end side and a free end on the further end side. The third type of shaped conductors are used to connect the stator winding and each form a connecting portion with a first type of shaped conductor on the other end side.

The number of layers is preferably at most sixteen, particularly preferably at most twelve. In preferred embodiments, L is exactly equal to six or exactly equal to eight or exactly equal to ten. The first layer can be the radially outermost or the radially innermost of the layers.

The number of winding zones for a respective phase can correspond to the number of poles of the stator winding. 2 P is preferably at most sixteen, particularly preferably at most twelve. In preferred embodiments, 2 P is exactly equal to six or exactly equal to eight or exactly equal to ten.

q can also be referred to as the number of holes in the stator winding. q is preferably at most six, particularly preferably at most four. In particularly preferred embodiments, q is exactly equal to two or exactly equal to three or exactly equal to four.

In a preferred embodiment of the stator according to the invention, the receiving locations are interlaced at least within the first or the (L/2)-th double layer.

It may also be provided that the respective winding zone within the [(L/2)–A] remaining double layers extends over exactly q slots in each case. In other words, the winding zones in the [(L/2)–A] remaining double layers can be non-interlaced or extend over exactly q directly adjacent slots. This has the advantage that only at one radial position in a slot do receiving locations of different phases adjoin each other and form so-called phase boundaries. This facilitates protective measures against electrical breakdowns between different phases, as these are only required at the aforementioned radial position.

In a specific embodiment, it can be provided that first to (2 N P q)-th slots are provided, which are named according to the order in the circumferential direction, wherein for one of the phases the receiving locations are located within the double layers in which the receiving locations are interlaced, in the (q+1)-th slot and the (2 N P q)-th slot as well as in the (x q N)-th slot and the [(x q N)+q+1]-th slot for all natural numbers 1≤x≤[(2 P)–1] and the receiving locations are located within the [(L/2)–A] double layers, in which the respective winding zone extends over exactly q slots, are located in the x-th to (x+q–1)-th slots, for all natural numbers 1≤x≤[(2 P)–1].

Furthermore, it may be provided that q≥3 and that for the phase the receiving locations within the double layers, in which the receiving locations are interlaced, are also located in the second to (q–1)-th slot and in the [(x q N)+2]-th to [(x q N)+q–1]-th slot.

For the other phases, the receiving locations can each be arranged offset by q slots in the circumferential direction.

In a preferred embodiment of the stator according to the invention, the stator winding forms a shaft winding. Such a stator winding is geometrically simple to realize with regard to the design of the connecting portions on the end side.

With particular advantage, it can be provided that an axial extent of connecting portions which connect leg portions arranged in the interlaced receiving locations at the end side is smaller than that of connecting portions which connect leg portions arranged in the receiving locations of the [(L/2)–A] remaining double layers at the end side. In other words, a smaller winding overhang is provided in the interlaced double layers than in the other double layers. Figuratively speaking, a winding head formed by the connecting portions on the end side can have a stepped axial extent along the radial direction. In particular, this enables improved cooling of the winding head if spray cooling is provided and provides additional space for the arrangement of stator winding connections.

Furthermore, a particularly preferred axial extent of connecting portions which connect leg portions arranged in the receiving locations of one of the [(L/2)–A] remaining double layers at the end side is smaller than that of connecting portions which connect leg portions arranged in the receiving locations of another of the [(L/2)–A] remaining double layers at the end side. In particular, the receiving locations of the other of the [(L/2)–A] remaining double layers lie radially between the interlaced double layer or the A interlaced double layers and the receiving locations of one of the [(L/2)–A] remaining double layers.

In the stator according to the invention, each phase can have several current paths, each of which has a series connection of first to L-th conductor sequences of several leg portions connected in series, wherein the conductor sequences are named according to their order along the series connection. The series connection is preferably made alternately by connecting portions arranged on the end side and the other end side.

It is preferable for the leg portions of a respective conductor sequence to be arranged in a single double layer and for the layers of the double layer to alternate along the current path.

In an advantageous embodiment, the first to (L/2)-th conductor sequences extend along a predetermined first circumferential direction around the stator core. The [(L/2)+1]-th to L-th conductor sequences can extend around the stator core along a second circumferential direction opposite to the first circumferential direction. The current path thus forms a change of direction with respect to the circumferential direction. It may be provided that, viewed from the end side, the first circumferential direction is counterclockwise and the second circumferential direction is clockwise. Alternatively, viewed from the end side, the first circumferential direction can be clockwise and the second circumferential direction counterclockwise.

It may also be provided that the leg portions of the (L/2)-th conductor sequence and the [(L/2)+1]-th conductor sequence, which are directly consecutive with respect to the series connection, are arranged in the same position, in particular the first position or the L-th position. In other words, the last leg portion of the (L/2)-th conductor sequence with respect to the series connection and the first leg portion of the [(L/2)+1]-th conductor sequence are arranged in the same position.

Preferably, each winding zone is subdivided into first to q-th partial winding zones, each of which extends over all layers and is named according to its order in the circumferential direction. Each conductor sequence preferably occupies all partial winding zones. Leg portions connected by a connecting portion arranged on the other end side can be arranged here in the same partial winding zone and/or leg portions of the conductor sequence connected by a connecting portion arranged on the end side can be arranged in different partial winding zones. Preferably, with regard to the series connection, directly consecutive leg portions of different conductor sequences are arranged in the same partial winding zone and/or are connected by connecting portions arranged on the end side.

In a specific development, it may be provided that each conductor sequence comprises first to (2 P)-th leg portions, which are named according to their order along the series connection. It is preferred here that in the odd-numbered conductor sequences, the [(j 2 P/q)+1]-th to [(j+1) 2 P/q]-th leg portions are arranged in the (j+1)-th partial winding zone, for all integers 0≤j≤(q−1). Alternatively or additionally, it may be provided that the [(k 2 P/q)+1]-th to [(k+1) 2 P/q]-th leg portions of the even-numbered conductor sequences are arranged in the (q−k)-th partial winding zone, for all integers 0≤k≤(q−1).

Preferably, the leg portions connected by connecting portions arranged on the end side, which are arranged in the double layer or A double layers within which the receiving locations are interlaced, are distanced from one another by fewer than N q slots, in particular in N q−2 slots. Preferably, the leg portions of the first conductor sequence and/or the L-th conductor sequence connected by connecting portions arranged on the end side are distanced from one another by fewer than N q slots, in particular in N q−1 slots. Preferably, the leg portions of the second conductor sequence and/or the (L−1)-th conductor sequence connected by connecting portions arranged on the end side are distanced from one another by more than N q slots, in particular N q+1 slots.

Preferably, the leg portions of the first and the second conductor sequence and/or the (L−1)-th and the L-th conductor sequence, which are directly consecutive with respect to the series connection, are distanced from one another by N q slots. Preferably, the leg portions of the [(L/2)-1]-th and the (L/2)-th conductor sequence and/or the [(L/2)+1]-th and the [(L/2)+2]-th conductor sequence, which immediately follow each other with respect to the series connection, are distanced from one another by more than N q slots, in particular N q+1 slots. Preferably, the directly consecutive leg portions of the (L/2)-th and the [(L/2)+1]-th conductor sequence with respect to the series connection are distanced from one another by N q slots.

Preferably, the connecting portions arranged on the other end side connect shaped conductors that are arranged in receiving locations distanced from one another by N q slots. This allows a uniform winding overhang to be realized at the other end side.

Preferably, each current path has a first outer leg portion and a second outer leg portion formed by the outer leg portions with respect to the series connection, wherein the outer leg portions of each current path are arranged in immediately adjacent winding zones for the same phase, and the outer leg portions of the current paths of a respective phase are arranged in respectively different winding zones.

In the stator according to the invention, it is also possible in principle for at least one double layer to be displaced by a slot in the circumferential direction relative to a radially adjacent double layer.

The object on which the invention is based is furthermore achieved by an electric machine having a stator according to the invention and a rotor which is rotatably supported relative to the stator.

The electric machine can be a synchronous machine. The rotor can be permanently excited or electrically excited. Alternatively, the electric machine may be an asynchronous machine. The electric machine is preferably designed to drive a vehicle.

The electric machine can also have a cooling device that is set up to spray a cooling fluid onto the connecting portions arranged on the end side.

The object on which the invention is based is furthermore achieved by a vehicle having an electric machine according to the invention, which is designed to drive the vehicle.

The vehicle may be a battery electric vehicle (BEV) or a hybrid vehicle.

Further advantages and details of the present invention can be found in the exemplary embodiments described below and with reference to the drawings. The latter are schematic illustrations and:

Figure 5:
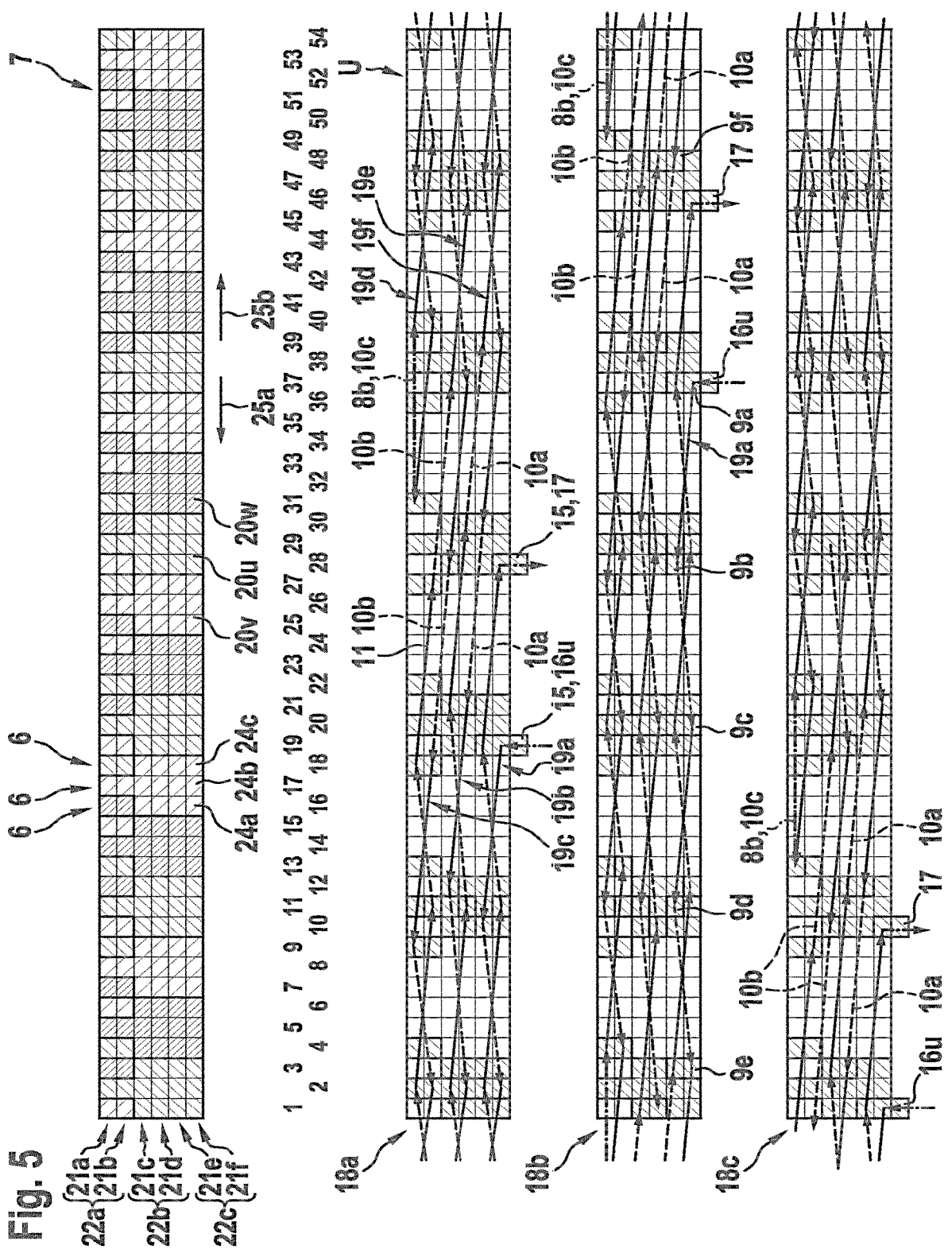
Figure 6:
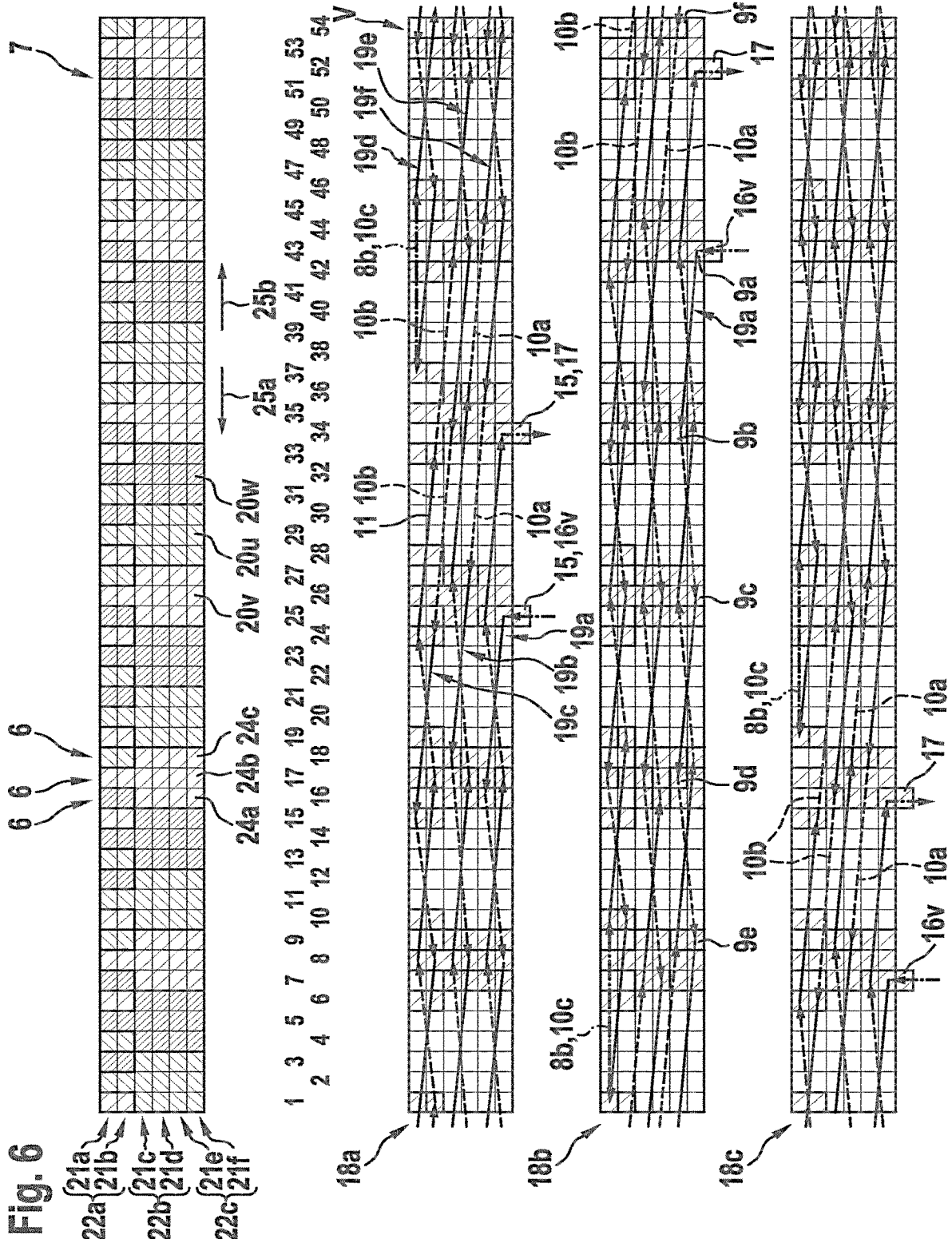
Figure 7:
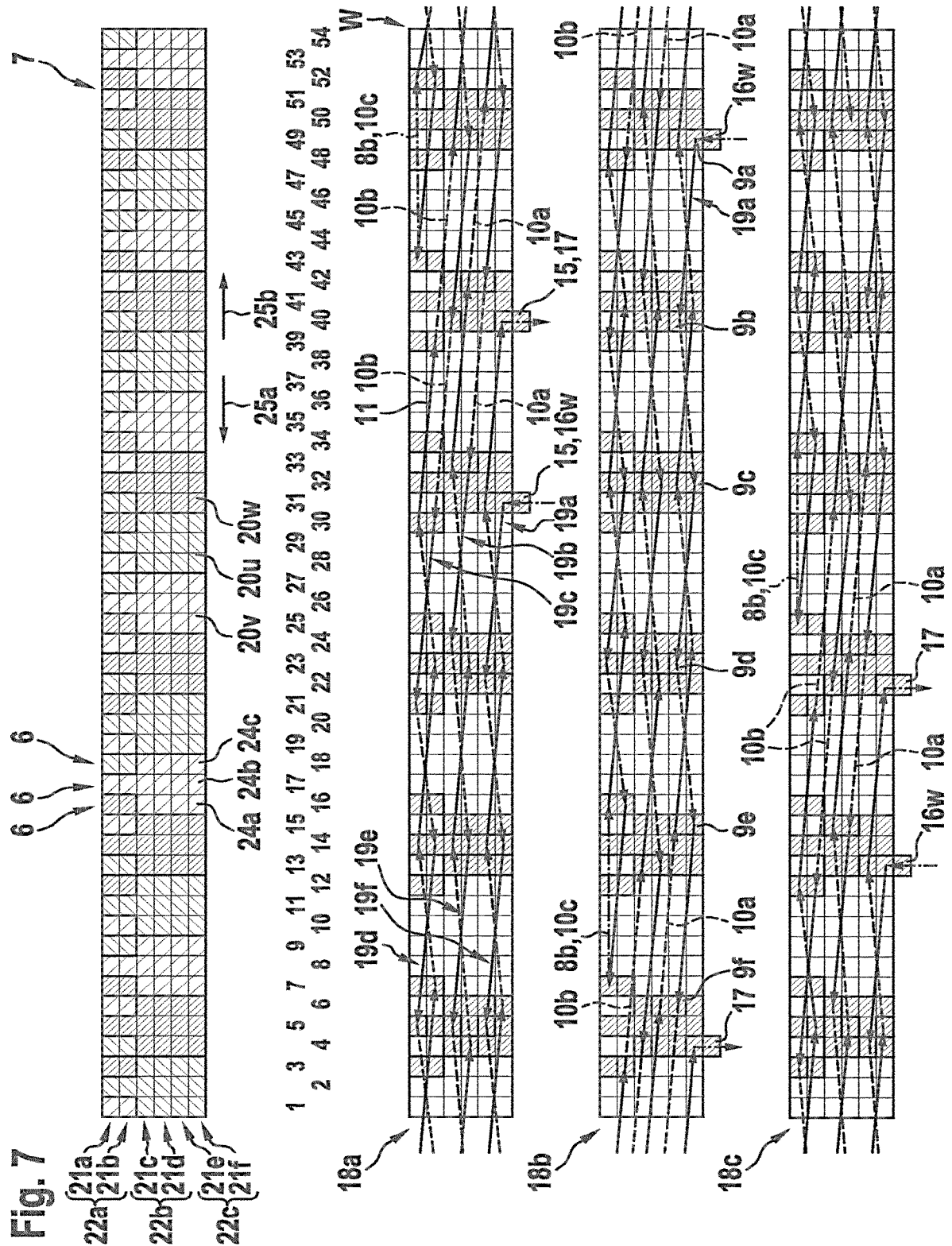
Figure 8:
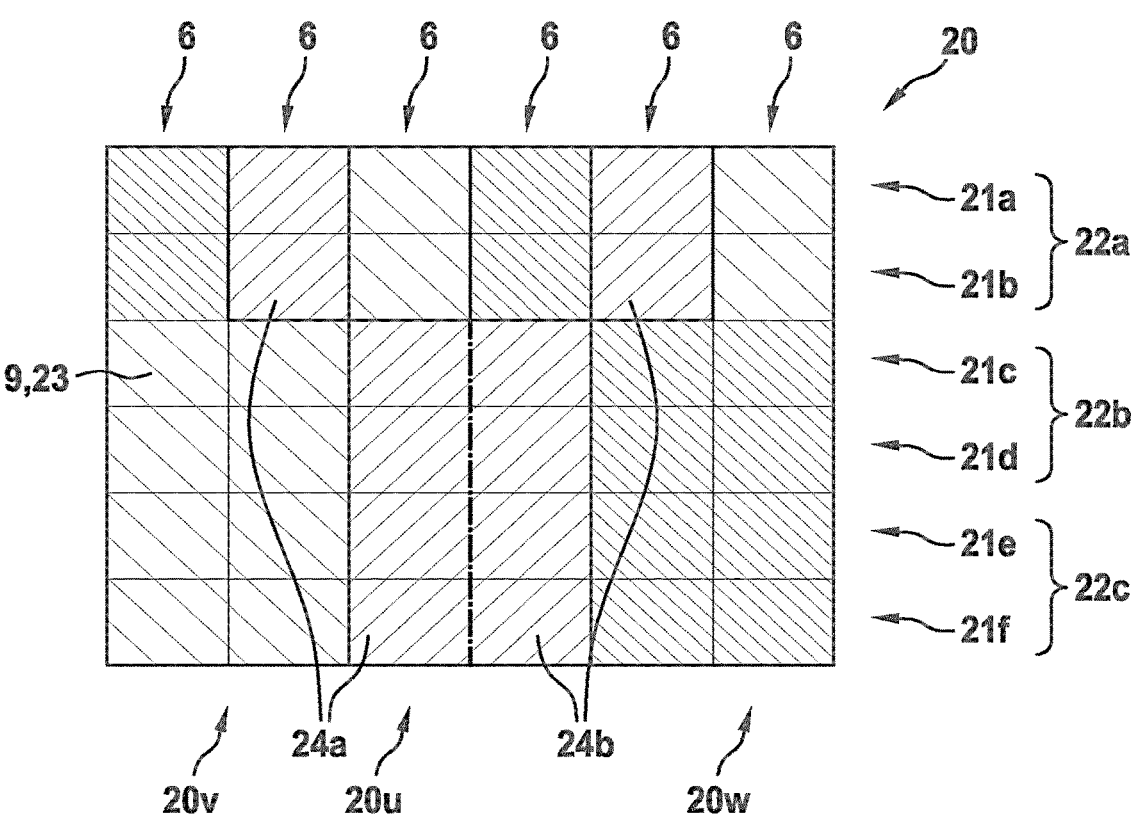
Figure 9:
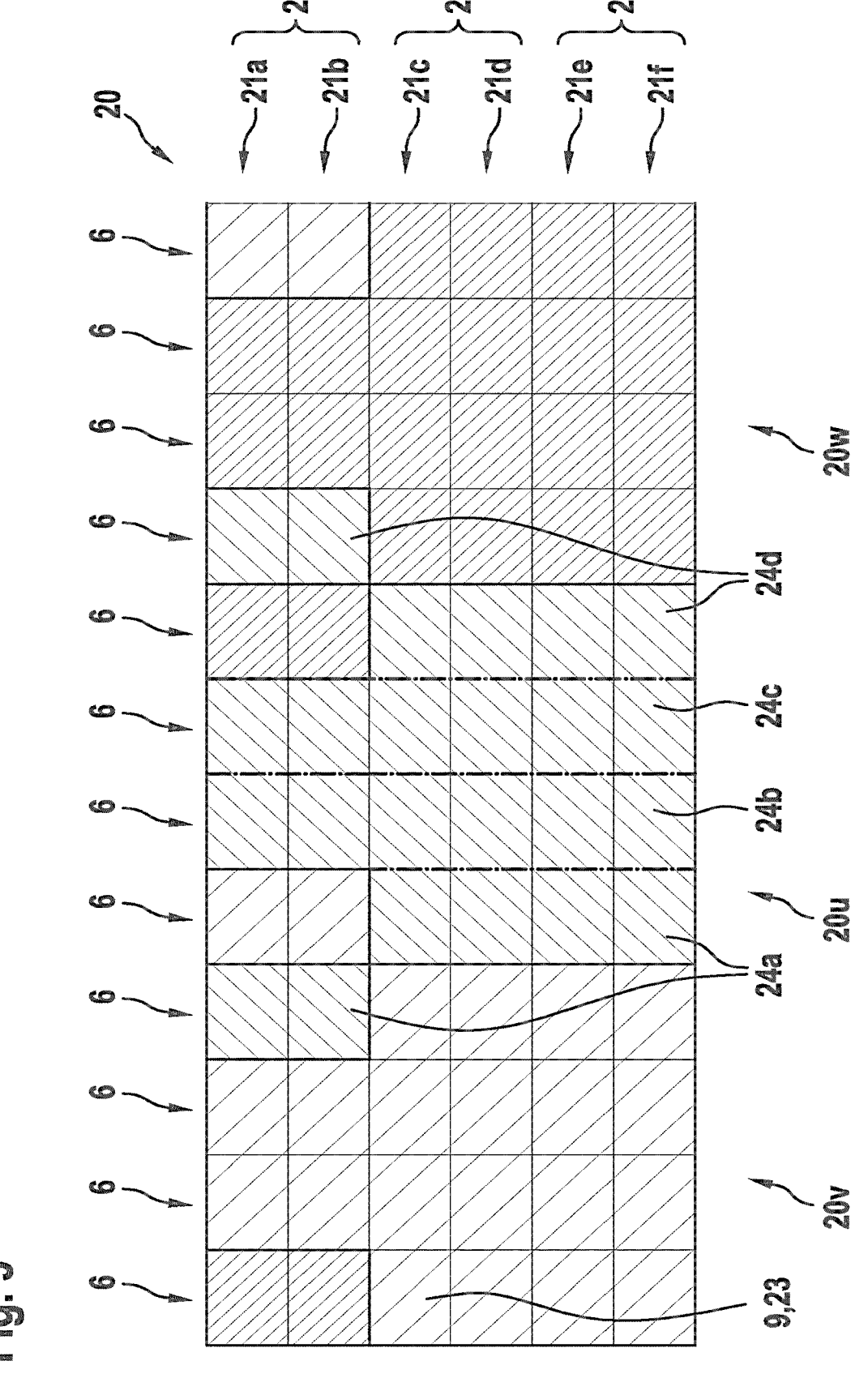
Figure 10:
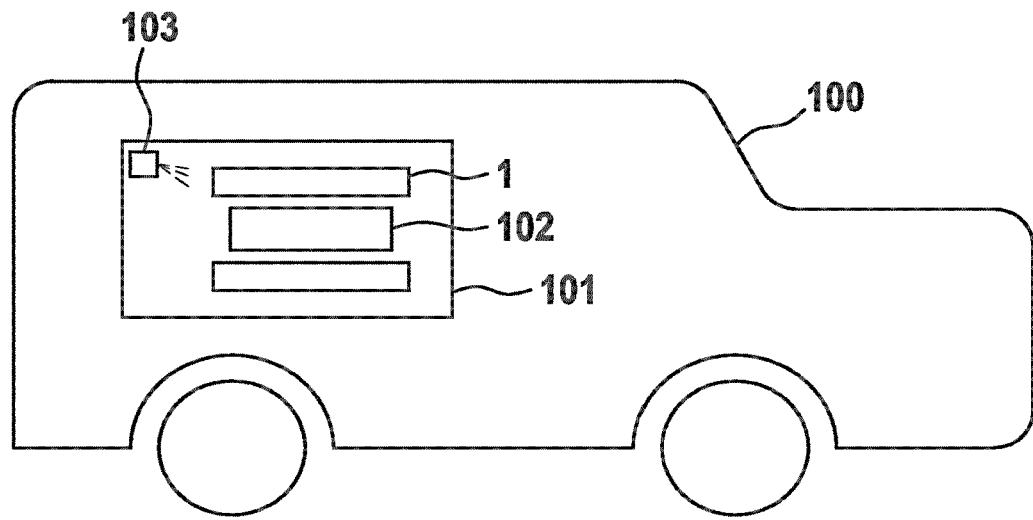

FIGS. 5 to 7 each show a winding diagram of a phase of the stator winding;

FIGS. 8 and 9 each show a detail of a winding zone according to further exemplary embodiments of the stator; and FIG. 10 shows a schematic diagram of an exemplary embodiment of the vehicle according to the invention having an exemplary embodiment of the electric machine according to the invention.

Figures 1, 2:
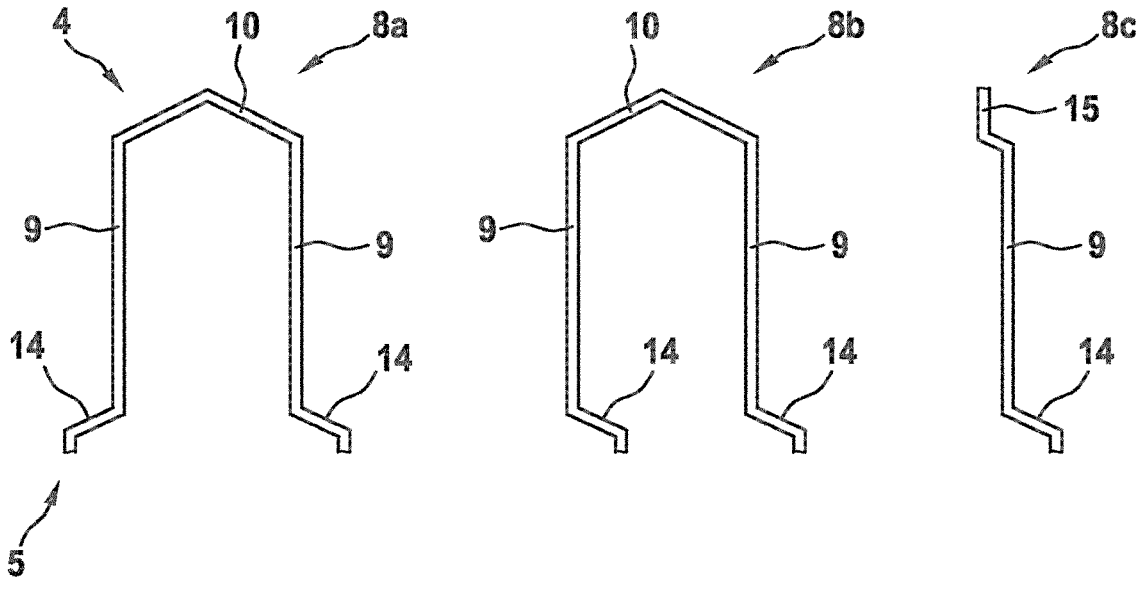
FIG. 1 shows a schematic diagram of an exemplary embodiment of the stator according to the invention.
FIG. 2 shows schematic diagrams of shaped conductors of the stator.

FIG. 1 is a schematic diagram of an exemplary embodiment of a stator 1.

The stator 1 has a stator core 2, which has a longitudinal axis 3, a first end side 4 and a further end side 5 opposite the end side 4. A multiplicity of slots 6 of the stator core 2, of which only two are shown schematically in FIG. 1, extend from the end side 4 to the further end side 5. As an example, the stator core 2 is formed from a plurality of individual laminations (not shown) that are arranged in axial layers and are electrically insulated from one another, so that it can also be referred to or considered as a stator laminated core.

Figure 3:
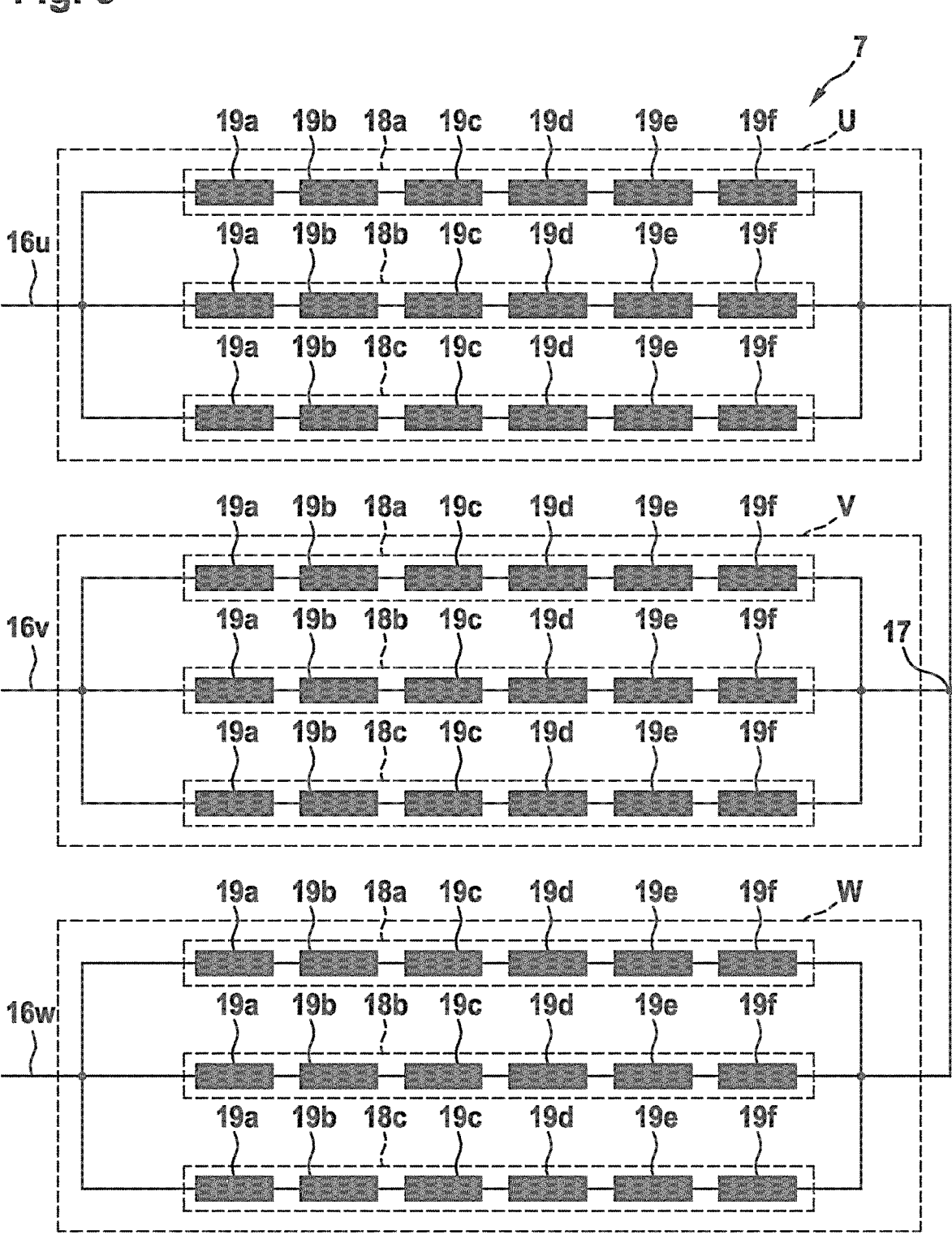
FIG. 3 shows a block circuit diagram of the stator winding of the stator.

The stator 1 also has a stator winding 7, which in the present exemplary embodiment has N=3 phases U, V, W (see FIG. 3). Each phase U, V, W is formed by shaped conductors 8, which have leg portions 9 arranged within the slots 6. The shaped conductors 8 also have connecting portions 10, 11, each of which connects two of the leg portions 9 to each other in an electrically conductive manner. The connecting portions 10 are provided on the end side 4 and form a winding head 12 there. The connecting portions 11 are provided on the further end side 5 and form another winding head 13 there. In FIG. 1, only one shaped conductor 8 in full and two other shaped conductors 8, which form one of the connecting portions 11 with it, are shown schematically.

FIG. 2 shows a schematic sketch of shaped conductors 8. In the specific exemplary embodiment, a first type of shaped conductors 8a, a second type of shaped conductors 8b and a third type of shaped conductors 8c are provided, which are generally designated by the reference sign 8.

Each first type of shaped conductor 8a has two leg portions 9 and a connecting portion 10 connecting the two leg portions at the end side 4. On the further end side 5, free ends 14 are connected to a respective leg portion 9 of the first type of shaped conductor 8a, each of which is electrically conductively connected to a free end 14 of another shaped conductor 8a, 8b, 8c, so that the connected free ends 14 form a connecting portion 11 on the further end side 5. The free ends 14 of the first type of shaped conductor 8a point away from each other in the circumferential direction.

Each shaped conductor of the second type 8b has two leg portions 9 and a connecting portion 10 connecting the two leg portions at the end side 4. On the further end side 5, free ends 14 are connected to a respective leg portion 9 of the second type of shaped conductor 8b, each of which is electrically conductively connected to a free end 14 of the first type of shaped conductor 8a, so that the connected free ends 14 form a connecting portion 11 on the further end side 5. The free ends 14 of the second type of shaped conductors 8b point—in contrast to the first type of shaped conductors 8a—in the same circumferential direction.

Each third type of shaped conductor 8c has a leg portion 9, a free end 15 on the end side 4 and a free end 14 on the other end side 5. The third type of shaped conductors 8c are used to connect the stator winding 7 and each form a connecting portion 11 to a first type of shaped conductor 8a on the other end side 5.

The shaped conductors 8 or 8a, 8b, 8c are each formed by a multi-bent, non-flexible metal rod made of copper with a rectangular or rounded rectangular cross-sectional area.

FIG. 3 is a block circuit diagram of the stator winding 7 of the stator 1.

As already described, the stator winding 7 has three phases U, V, W. Each phase has a phase connection 16u, 16v, 16w. The phases U, V, W are connected together at their ends opposite the phase connections 16u, 16v, 16w to form a star point 17. The phase connections 16u, 16v, 16w are formed by the free ends 15 on the end side 4 of the shaped conductors of the third type 8c. The star point 17 is formed by an electrically conductive connection of free ends 15 of the shaped conductors of the third type 8c at the end side 4.

In this exemplary embodiment, it is specifically provided that each phase U, V, W has three current paths 18a, 18b, 18c, which are connected in parallel. Each current path 18a, 18b, 18c has a series connection of first to L-th, here first to sixth, conductor sequences 19a-f. The conductor sequences 19a-f are named according to their order along the series connection. From the phase connection 16u, 16v, 16w to the star point 17, the first conductor sequence 19a is followed by the second conductor sequence 19b, the second conductor sequence 19b by the third conductor sequence 19c, the third conductor sequence 19c by the fourth conductor sequence 19d, the fourth conductor sequence by the fifth conductor sequence 19e and the fifth conductor sequence 19e by the sixth conductor sequence 19f.

Each conductor sequence 19a-f is formed from a plurality of leg portions 9 that are connected in series by means of the connection portions 10, 11

Figure 4:
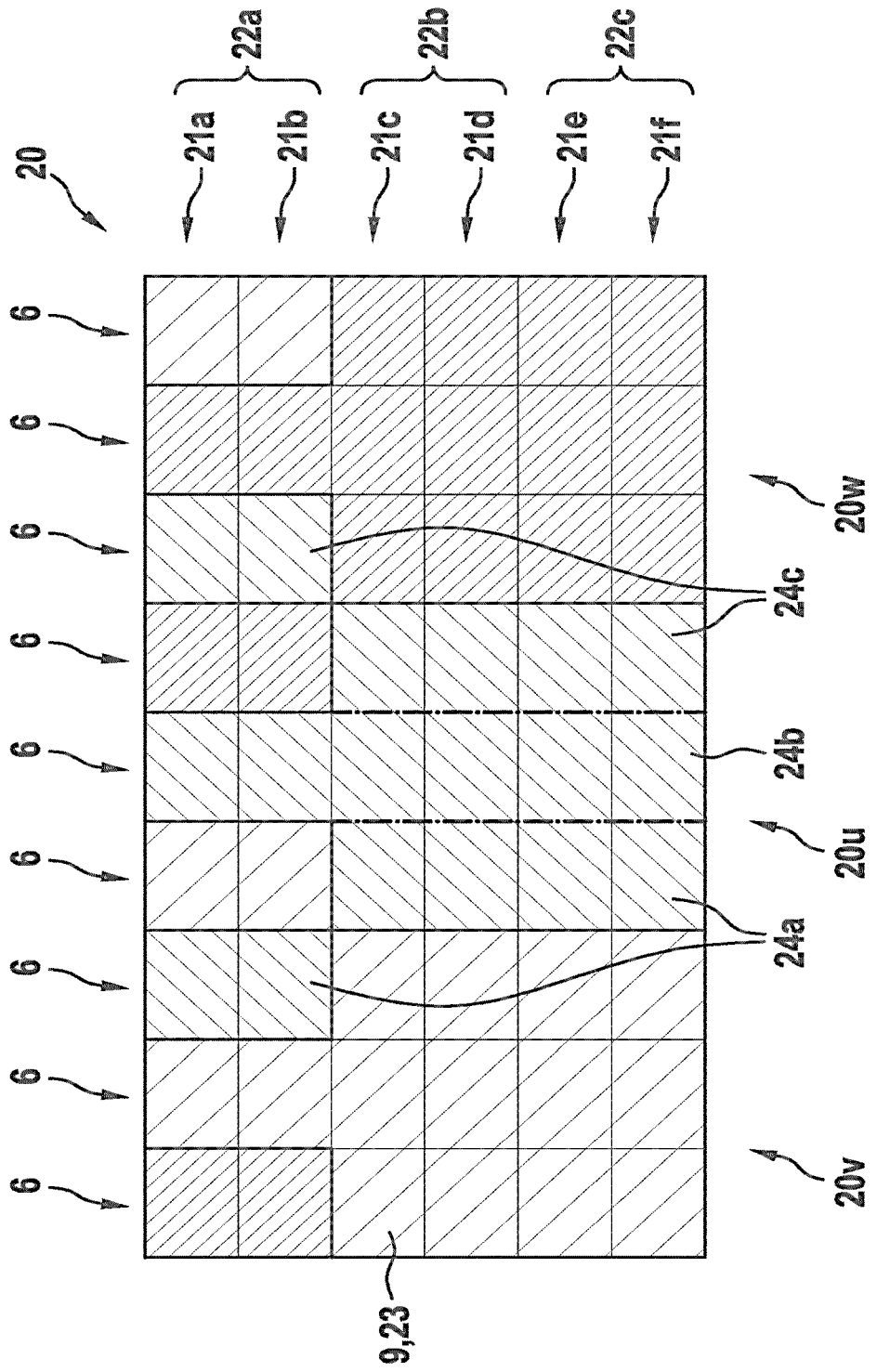
FIG. 4 shows a detailed illustration of the stator winding zones.

FIG. 4 shows a detail of a winding zone 20 for each phase U, V, W of the stator 1. The winding zones are generally designated with the reference sign 20 and winding zones for the phase U are designated with 20u, for the phase V with 20v, and for the phase W with 20w. In FIG. 4, the winding zones 20u, 20v, 20w are marked by different hatching.

Each slot 6 is subdivided radially into first to L-th layers, i.e. first to sixth layers 21a-f, which are named according to their order in the radial direction. The first layer 21a is the radially outermost layer as an example. The layers form first to (L/2)-th double layers, i.e. first to third double layers 22a, 22b, 22c. Here, the first double layer 22a comprises the first layer 21a and the second layer 21b, the second double layer 22b comprises the third layer 21c and the fourth layer 21d, and the third double layer 22c comprises the fifth layer 21e and the sixth layer 21f. Generally speaking, the i-th double layer comprises the (2i−1)-th and the (2i)-th layer for all natural numbers 1≤i≤(L/2), wherein i is a natural number.

Each layer 21a-f in a respective slot 6 forms a receiving location 23 in which one of the leg portions 9 is arranged. The receiving locations 23 are each illustrated in FIG. 4 by a box. The leg portion 9 arranged therein is not additionally shown for reasons of clarity. The receiving locations for a respective phase U, V, W form a number of 2 P=6 winding zones 20. A total of six winding zones 20u, six winding zones 20v and six winding zones 20w are therefore provided.

In each winding zone 20, the leg portions 9 are passed through in the same current direction by the shaped conductors 8 forming the phase U, V, W when an N-phase, in this case a three-phase, alternating voltage is applied to the stator winding 7. P corresponds here to the number of pole pairs of the stator 1.

Each winding zone 20 comprises a number q=3 of receiving locations in each of the layers. q can thus also be understood as the number of holes in the stator 1 or as the number of slots 6 per pole and phase.

In the present exemplary embodiment, within a number A=1 of double layers, here the first double layer 22a, of a respective winding zone 20, the receiving locations 23 are interlaced with a circumferentially adjacent winding zone 20 of another of the phases U, V, W in such a way that the leg portions 9 of another of the phases U, V, W are surrounded on both sides in the circumferential direction by two leg portions 9 of the respective winding zone 20 arranged in the double layer 22a. In FIG. 4, in which only one winding zone 20u of the phase U is shown in its entirety, the leg portions 9 of a respective other phase V, W are thus surrounded on both sides in the first double layer 22a by two leg portions of the winding zone 20u arranged in the first double layer 22a. This applies analogously to the other winding zones 20v, 20w.

In the [(L/2)−A] remaining double layers, i.e., in the second double layer 22b and the third double layer 22c, each winding zone extends over exactly q=3 slots 6. The receiving locations 23 of the second and third double layers 22b, 22c are therefore not interlaced.

FIG. 4 also shows that each winding zone 20 is subdivided into first to q-th, i.e., first to third, partial winding zones 24a, 24b, 24c, which each extend over all layers and are named according to their order in the circumferential direction. Boundaries between two adjacent partial winding zones 24a, 24b, 24c of the same winding zone 20 are shown in FIG. 4 by a dotted line.

FIG. 5 shows a winding diagram of the phase U of the stator winding 7. Here, an upper table shows the distribution of the winding zones 20 over the slots 6 and layers 21a-f. The three lower tables show the winding diagram, wherein connections at the end side 4 by means of the connecting portions 10 of the first type of shaped conductor 8a are shown by dashed arrows, connections at the end side 4 by means of the connecting portions 10 of the second type of shaped conductor 8a are shown by dotted arrows, and connecting portions 11 at the other end side 5 are shown by solid arrows.

First to (2 N P q)-th slots, i.e., first to fifty-fourth slots 6, are provided in the stator core 2 and are named according to their order in the circumferential direction. Corresponding slot numbering is provided below the top table.

For the phase U, the receiving locations 23 within the double layer 22a, in which the receiving locations 23 are interlaced, are located in the second, fourth, ninth, eleventh, thirteenth, eighteenth, twentieth, twenty-second, twenty-seventh, twenty-ninth, thirty-first, thirty-sixth, thirty-eighth, fortieth, forty-fifth, forty-seventh, forty-ninth and fifty-fourth slots 6. Generally speaking, the receiving locations within the double layer 22a, in which the receiving locations 23 are interlaced, are located in the second slot 6, the (q+1)-th slot 6, the (2 N P q)-th slot, in the (x q N)-th slot 6 and the [(x q N)+q+1]-th slot 6 as well as [(x q N)+2]-th to [(x q N)+q−1]-th slot 6 for all natural numbers 1≤x≤[(2 P)−1].

The receiving locations 23 within the second and third double layers 22b, 22c, in which the respective winding zone 20 extends over exactly q=3 slots 6, are located in the first to third slot 6, in the tenth to twelfth slot 6, in the nineteenth to twenty-first slot 6, in the twenty-eighth to thirtieth slot 6, in the thirty-seventh to thirty-ninth slot 6 and in the forty-sixth to forty-eighth slot 6. Generally speaking, the receiving locations within the [(L/2)–A] double layers 22b, 22c, in which the respective winding zone 20 extends over exactly q slots 6, are located in the x-th to (x+q−1)-th slots 6 for all natural numbers 1≤x≤[(2 P)−1].

As can be seen from FIG. 5, the leg portions 9 of the first conductor sequence 19a, which begins at the phase connection 16u, are arranged in the first double layer 22a, the leg portions 9 of the second conductor sequence 19b are arranged in the second double layer 22b, the leg portions 9 of the third conductor sequence 19c are arranged in the third double layer 22c, the leg portions 9 of the fourth conductor sequence 19d are arranged in the third double layer 22c, the leg portions 9 of the fifth conductor sequence 19e are arranged in the second double layer 22b, and the leg portions of the sixth conductor sequence 19f, which ends at the star point 17, are arranged in the first double layer 22a. Within the double layers 22a, 22b, 22c, the leg portions 9 alternate the layers 21a-f of the respective double layer 22a, 22b, 22c. The leg portions 9 of the third conductor sequence 19c and the fourth conductor sequence 19d, which are directly consecutive with respect to the series connection, are arranged in the first layer 21a.

The first to (L/2)-th conductor sequences, i.e. the first, second and third conductor sequences 19a, 19b, 19c, extend around the stator core 2 along a predetermined first circumferential direction 25a and the [(L/2)+1]-th to L-th conductor sequences, i.e., the fourth, fifth and sixth conductor sequences 19d, 19e, 19f, extend around the stator core 2 along a second circumferential direction 25b that is opposite to the first circumferential direction 25a. In this example, the first circumferential direction 25a corresponds to the counterclockwise direction when viewed from the end side 4 (cf. FIG. 1).

As can also be seen in FIG. 5, each conductor sequence 19a-f comprises first to 2 P-th leg portions, i.e., first to sixth leg portions 9a-f, which are named according to their order along the series connection. For reasons of clarity, the reference signs 9a-f are only shown for the first conductor sequence 19a of the second current path 18b.

Each conductor sequence 19a-f occupies all partial winding zones 24a, 24b 24c. In the first, third and fifth conductor sequence 19a, 19c, 19e, the first and second leg portions 9a, 9b are arranged in the first partial winding zone 24a, the third and fourth leg portions 9c, 9d are arranged in the second partial winding zone 24b, and the fifth and sixth leg portions 9e, 9f are arranged in the third partial winding zone 24c. In the second, fourth and sixth conductor sequence 19b, 19d, 19f, the first and second leg portions 9a, 9b are arranged in the third partial winding zone 24c, the third and fourth leg portions 9c, 9d are arranged in the second partial winding zone 24b, and the fifth and sixth leg portions 9e, 9f are arranged in the first partial winding zone 24a. Generally speaking, the [(j 2 P/q)+1]-th to [(j+1) 2 P/q]-th leg portions are arranged in the (j+1)-th partial winding zone for all integers 0≤j≤(q−1) for the odd-numbered conductor sequences, and for the even-numbered conductor sequences, the [(k 2 P/q)+1]-th to [(k+1) 2 P/q]-th leg portions are arranged in the (q−k)-th partial winding zone, for all integers 0≤k≤(q−1).

The connecting portions 10 of the third and fourth conductor sequence 19c, 19d arranged at the end side 4, i.e., those of which the leg portions 9 are arranged in the interlaced receiving locations 23, connect leg portions 9 which are arranged in receiving locations 23 at a distance from one another of N q−2=7 slots 6. The connecting portions 10 of the second and fifth conductor sequence 19b, 19e arranged at the end side 4 connect leg portions 9 which are arranged in receiving locations 23 distanced from one another by N q+1=10 slots 6. The connecting portions 10 of the first and sixth conductor sequence 19a, 19f arranged at the end side 4 connect leg portions 9 which are arranged in receiving locations 23 distanced from one another by N q−1=8 slots 6.

Since the greater distance between the receiving locations 23 in the second double layer 22b results in a greater axial extent of the connecting portions 10, a winding overhang of the winding head 12 (see FIG. 1) at the end side 4 is greater in the second double layer 22b. This has the advantage that these connecting portions 10 can be better reached by spray cooling than with a uniform winding overhang.

In FIG. 5, connecting portions that connect the sixth leg portion 9f of the first conductor sequence 19a or the fifth conductor sequence 19e to the first leg portion 9a of the second conductor sequence 19b or the sixth conductor sequence 19f are separately labeled 10a. These leg portions 9a, 9f are distanced from one another by N q=9 slots 6.

Connecting portions that connect the sixth leg portion 9f of the second conductor sequence 19b or the fourth conductor sequence 19d to the first leg portion 9a of the third conductor sequence 19c or the fifth conductor sequence 19e are separately labeled 10b. These leg portions 9a, 9f are distanced from one another by N q+1=10 slots 6.

Connecting portions that connect the sixth leg portion 9f of the third conductor sequence 19c to the first leg portion 9a of the fourth conductor sequence 19d are separately labeled 10c. These leg portions 9a, 9f are distanced from one another by N q=9 slots 6. They are also formed by the second type of shaped conductors 8b, while the other connecting portions 10 on the end side 4 are formed by the first type of shaped conductors 8a.

The connecting portions 11 on the second end side 5 all connect leg portions 9, which are distanced from one another by N q=9 slots 6.

In addition, each current path 18a, 18b, 18b has a first outer leg portion, in this case the first leg portion 9a of the first conductor sequence 19a, and a second outer leg portion, in this case the sixth leg portion 9f of the sixth conductor sequence 19f. The outer leg portions 9a, 9f of each current path 18a, 18b, 18b are arranged in directly adjacent winding zones 20 for the same phase U, V, W. The outer leg portions 9a, 9f of the current paths 18a, 18b, 18c of a respective phase U, V, W are each arranged in different winding zones 20.

FIG. 6 and FIG. 7 each show a winding diagram of the phases V, W of the stator winding 7, the representation of which corresponds to that in FIG. 5. In this regard, identical or identically acting components are provided with identical reference signs. It can be seen that the winding diagrams of the phases V, W correspond to the winding diagram of the phase U shown in FIG. 5 except for a shift by q slots in the circumferential direction.

According to a further exemplary embodiment of the stator 1, the current paths 18a, 18b, 18c of a respective phase U, V, W are connected in series. According to a further exemplary embodiment, the first layer is the radially innermost layer. According to a further exemplary embodiment, the receiving locations of two or more double layers 22a, 22b can be interlaced.

FIG. 8 and FIG. 9 each show a detail of a winding zone according to further exemplary embodiments of the stator 1, wherein the representation corresponds to that in FIG. 4. In the exemplary embodiment shown in FIG. 8, the number of holes is q=2. Accordingly, only two partial winding zones 24*a*, 24*b* are provided. In the exemplary embodiment shown in FIG. 9, the number of holes is q=4. Accordingly, four partial winding zones 24*a-d* are provided.

Furthermore, the number of pole pairs can also be varied according to other exemplary embodiments, so that, for example, P=2, P=4, P=5 or P=6 pole pairs can be provided. The number of phases can also be N=6, for example.

FIG. 10 is a schematic diagram of an exemplary embodiment of a vehicle 100 with an exemplary embodiment of an electric machine 101.

The electric machine 101 has a power stator 1 in accordance with one of the exemplary embodiments described above. In addition, the electric machine 101 has a rotor 102 mounted rotatably relative to the stator 1. An axis of rotation of the rotor 102 corresponds here to the longitudinal axis 3 (see FIG. 1) of the stator 1. The electric machine 101 can be a synchronous machine in which the rotor 102 is permanently excited or electrically excited. The electric machine 101 can alternatively be an asynchronous machine.

The electric machine 101 is designed to drive the vehicle 100 which is, for example, a battery-electric vehicle (BEV) or a hybrid vehicle.

Optionally, the electric machine 101 has a cooling device 103 which is set up to spray a cooling fluid onto the connecting portions 10 arranged on the end side 4.

The invention claimed is:

1. A stator for an electric machine, comprising a stator core which has a longitudinal axis, an end side, a further end side opposite the end side and a plurality of slots arranged in the circumferential direction and extending from the end side to the further end side, and a stator winding which has a number N of phases, wherein N≥3, wherein each phase is formed by shaped conductors which have leg portions arranged within the slots and connecting portions which electrically conductively connect two of the leg portions (9) to each other at the end sides, wherein each slot is radially subdivided into first to L-th layers (21*a-f*) which are named according to their order in the radial direction, wherein the layers (21*a-f*) form first to (L/2)-th double layers (22*a-c*), wherein an i-th double layer (22*a-c*) comprises a (2i−1)-th and a (2i)-th layer (21*a-f*) for all natural numbers 1≤i≤(L/2), wherein L≥4 and is even, wherein L and i are natural numbers, wherein each layer forms a receiving location in a respective slot in which one of the leg portions is arranged, wherein the receiving locations for a respective phase form a number of 2 P winding zones and in a respective winding zone the leg portions are traversed by the phase-forming shaped conductors in the same current direction when an N-phase alternating voltage is applied to the stator winding, wherein 2 P≥6, wherein P is a natural number, wherein each winding zone in each of the layers comprises a number q≥2 of receiving locations, wherein q is a natural number, wherein within a number A of double layers of a respective winding zone, the receiving locations are interlaced with a circumferentially adjacent winding zone of another of the phases in such a way that the leg portions of another of the phases are surrounded on both sides in the circumferential direction by two leg portions of the respective winding zone arranged in the double layer, wherein 1≤A≤(L/2)−1, wherein A is a natural number.

2. The stator as claimed in claim 1, wherein the receiving locations are interlaced at least within s first or the (L/2)-th double layer.

3. The stator as claimed in claim 1, wherein the respective winding zone within a [(L/2)−A] remaining double layers extends over exactly q slots in each case.

4. The stator as claimed in claim 3, wherein first to (2 N P q)-th slots are provided, which are named according to their order in the circumferential direction, wherein, for one of the phases within the double layers in which the receiving locations are interlaced, the receiving locations are located in a (q+1)-th slot and a (2 N P q)-th slot and in a (x q N)-th slot and the [(x q N)+q+1]-th slot for all natural numbers 1≤x≤[(2 P)−1] and the receiving locations within the [(L/2)−A] double layers, in which the respective winding zone extends over exactly q slots, are located in a x-th to (x+q−1)-th slots, for all natural numbers 1≤x≤[(2·P)−1].

5. The stator as claimed in claim 4, wherein q≥3 and for the phase the receiving locations within the double layers, in which the receiving locations are interlaced, are also located in a second to (q−1)-th slot and in a [(x q N)+2]-th to [(x q N)+q−1]-th slot.

6. The stator as claimed in claim 1, wherein an axial extent of connecting portions which connect leg portions arranged in the interlaced receiving locations at the end side is smaller than that of connecting portions which connect leg portions arranged in the receiving locations of a [(L/2)−A] remaining double layers at the end side.

7. The stator as claimed in claim 1, wherein each phase can have several current paths, each of which has a series connection of first to L-th conductor sequences of several leg portions connected in series, wherein the conductor sequences are named according to their order along the series connection.

8. The stator as claimed in claim 7, wherein the leg portions of a respective conductor sequence are arranged in a single double layer and the layers of the double layer alternate along the current path.

9. The stator as claimed in claim 7, wherein first to (L/2)-th conductor sequences extend around the stator core along a predetermined first circumferential direction and a [(L/2)+1]-th to L-th conductor sequences extend around the stator core along a second circumferential direction that is opposite to the first circumferential direction.

10. The stator as claimed in claim 9, wherein the leg portions of the (L/2)-th conductor sequence and the [(L/2)+1]-th conductor sequence, which are directly consecutive with respect to the series connection, are arranged in the same position, in first position or a L-th position.

11. The stator as claimed in claim 7, wherein each winding zone is subdivided into first to q-th partial winding zones, each of which extends over all layers and is named according to its order in the circumferential direction, wherein each conductor sequence occupies all partial winding zones.

12. The stator as claimed in claim 11, wherein each conductor sequence comprises first to (2 P)-th leg portions, which are named according to their order along the series connection, wherein in odd-numbered conductor sequences, a [(j 2 P/q)+1]-th to [(j+1) 2 P/q]-th leg portions are arranged in a (j+1)-th partial winding zone, for all integers $0 \leq j \leq (q-1)$ and/or in the even-numbered conductor sequences, a [(k 2 P/q)+1]-th to [(k+1) 2 P/q]-th leg portions are arranged in a (q−k)-th partial winding zone, for all integers $0 \leq k \leq (q-1)$.

13. The stator as claimed in claim 7, wherein each current path has a first outer leg portion and a second outer leg portion formed by the outer leg portions with respect to the series connection, wherein the outer leg portions of each current path are arranged in immediately adjacent winding zones for the same phase, and the outer leg portions of the current paths of a respective phase are arranged in respectively different winding zones.

14. An electric machine, comprising a stator as claimed in claim 1 and a rotor mounted rotatably relative to the stator.

15. A vehicle having an electric machine as claimed in claim 14, which is set up to drive the vehicle.

16. The stator as claimed in claim 2, wherein the respective winding zone within a [(L/2)−A] remaining double layers extends over exactly q slots in each case.

17. The stator as claimed in claim 2, wherein an axial extent of connecting portions which connect leg portions arranged in the interlaced receiving locations at the end side is smaller than that of connecting portions which connect leg portions arranged in the receiving locations of a [(L/2)−A] remaining double layers at the end side.

18. The stator as claimed in claim 2, wherein each phase can have several current paths, each of which has a series connection of first to L-th conductor sequences of several leg portions connected in series, wherein the conductor sequences are named according to their order along the series connection.

19. The stator as claimed in claim 8, wherein first to (L/2)-th conductor sequences extend around the stator core along a predetermined first circumferential direction and a [(L/2)+1]-th to L-th conductor sequences extend around the stator core along a second circumferential direction that is opposite to the first circumferential direction.

20. The stator as claimed in claim 8, wherein each winding zone is subdivided into first to q-th partial winding zones, each of which extends over all layers and is named according to its order in the circumferential direction, wherein each conductor sequence occupies all partial winding zones.

* * * * *